(12) United States Patent
Szucher

(10) Patent No.: US 7,484,650 B2
(45) Date of Patent: Feb. 3, 2009

(54) SONOTRODE FOR CARRYING OUT CUTTING AND WELDING OPERATIONS ON WORKPIECES AND METHOD FOR THE OPERATION THEREOF

(75) Inventor: Attila Szucher, Hauptwil (CH)

(73) Assignee: Rinco Ultrasonics AG, Romanshorn (CH)

( * ) Notice: Subject to any disclaimer, the term of this patent is extended or adjusted under 35 U.S.C. 154(b) by 381 days.

(21) Appl. No.: 10/498,918

(22) PCT Filed: Dec. 13, 2002

(86) PCT No.: PCT/EP02/14195

§ 371 (c)(1),
(2), (4) Date: May 23, 2005

(87) PCT Pub. No.: WO03/051612

PCT Pub. Date: Jun. 26, 2003

(65) Prior Publication Data

US 2005/0263520 A1  Dec. 1, 2005

(30) Foreign Application Priority Data

Dec. 15, 2001 (DE) .................... 101 61 723

(51) Int. Cl.
*B06B 3/00* (2006.01)
*B26D 7/08* (2006.01)
*B26F 1/38* (2006.01)

(52) U.S. Cl. .............. 228/1.1; 228/110.1; 156/73.1; 156/73.6; 219/603

(58) Field of Classification Search ............... 228/1.1, 228/110.1; 156/73.1, 73.3, 73.4, 379.6, 580.1, 156/580.2; 219/603; 264/442–445; 425/174.2; 310/321, 323.18

See application file for complete search history.

(56) References Cited

U.S. PATENT DOCUMENTS

| | | | | |
|---|---|---|---|---|
| 3,681,176 A | * | 8/1972 | Reifenhauser et al. | ... 156/580.2 |
| 3,897,020 A | * | 7/1975 | Knecht | ...... 241/292.1 |
| 4,706,531 A | * | 11/1987 | Blauhut et al. | ............. 83/346 |
| 5,242,529 A | * | 9/1993 | Riedel | ....... 156/580.1 |
| 6,098,514 A | * | 8/2000 | Sato et al. | ............. 83/425.3 |
| 6,325,127 B1 | | 12/2001 | Waldrop | |

FOREIGN PATENT DOCUMENTS

| | | |
|---|---|---|
| DE | 29507068 U1 | 11/1995 |
| DE | 19630096 C2 | 3/1998 |
| DE | 298 13964 U1 * | 12/1998 |
| DE | 29813964 U | 2/1999 |
| EP | 0457187 A2 | 11/1991 |
| EP | 0498364 A2 | 8/1992 |
| EP | 0567426 A2 | 10/1993 |
| EP | 0800900 A | 10/1997 |
| JP | 04201546 A | 7/1992 |

* cited by examiner

*Primary Examiner*—Jessica L. Ward
*Assistant Examiner*—Devang Patel
(74) *Attorney, Agent, or Firm*—Browdy and Neimark, P.L.L.C.

(57) ABSTRACT

A sonotrode (33) for machining workpieces and a method for the operation of the sontotode. The sonotrode enables workpieces to be cut (1) and welded (5) simultaneously in a single work process. This results in substantially higher quality machined workpieces in comparison with the prior art. Cutting and welding occur in parallel in a single process.

18 Claims, 5 Drawing Sheets

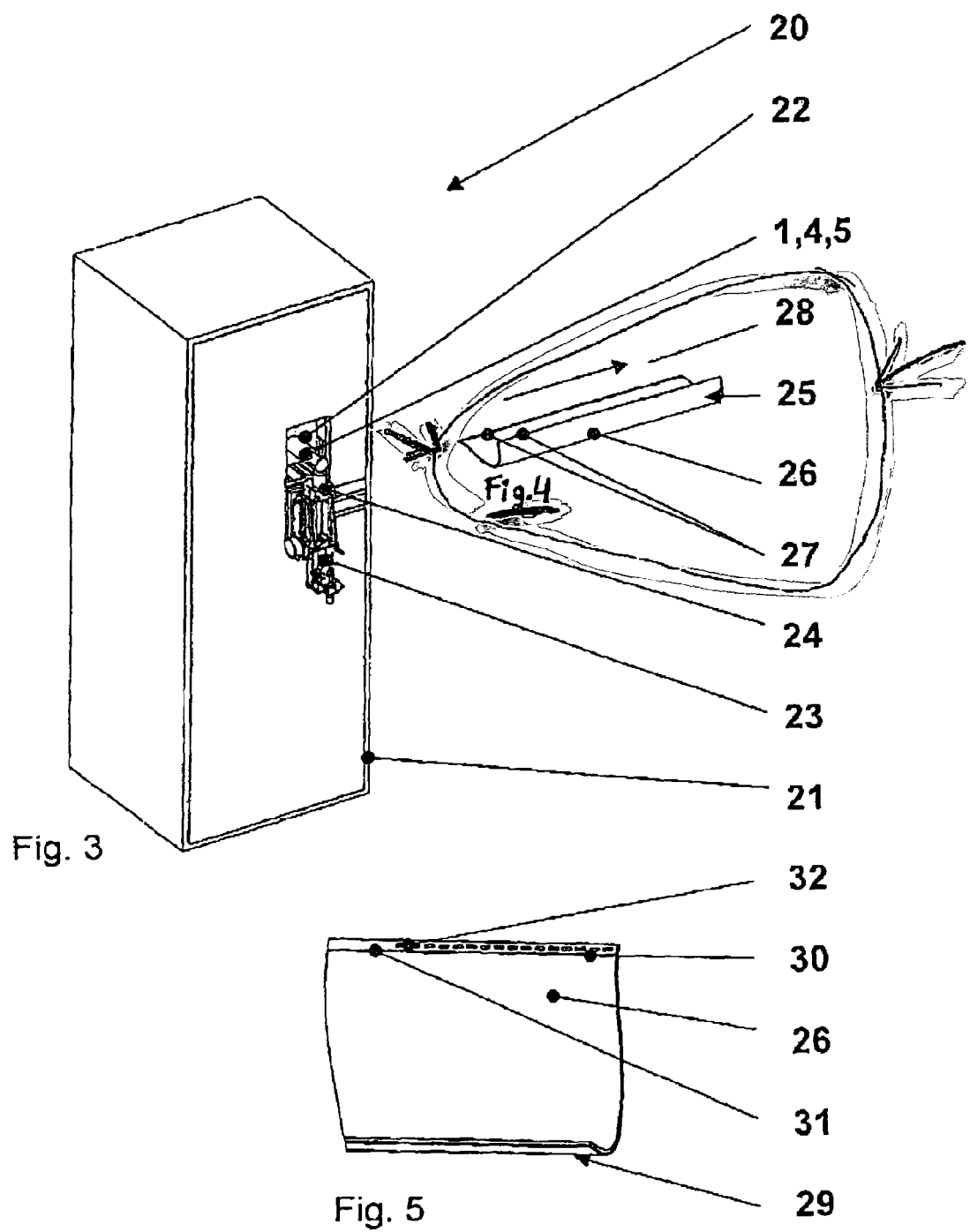

Figure 1:
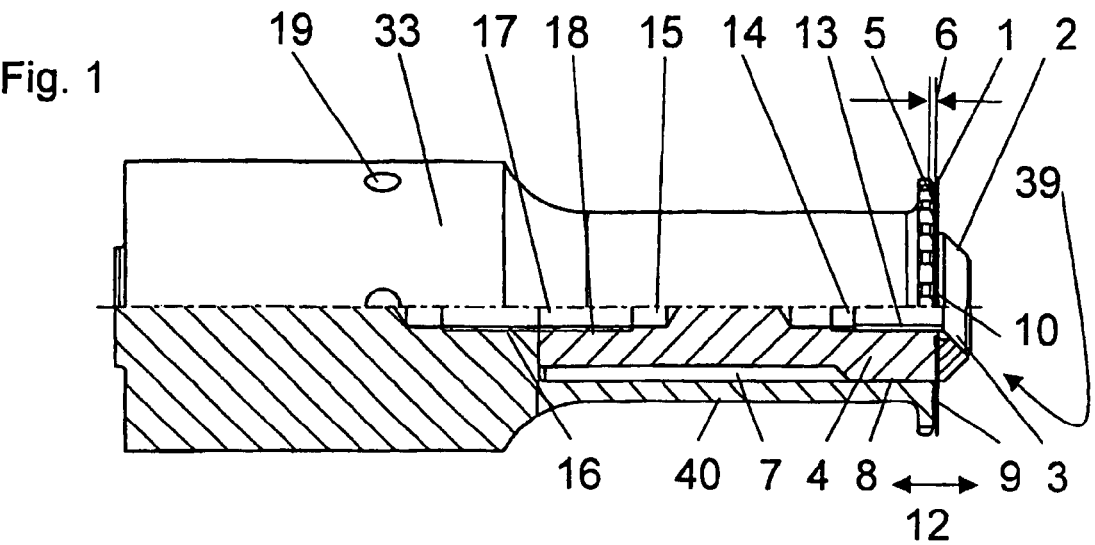

SONOTRODE FOR CARRYING OUT CUTTING AND WELDING OPERATIONS ON WORKPIECES AND METHOD FOR THE OPERATION THEREOF

The subject of the invention is a sonotrode for machining work pieces and a method for the operation of said sonotrode according to the precharacterizing portions.

Until now it was not possible under the prior art methods to use a sonotrode simultaneously for 2 operations, namely for welding and cutting, instead it could be used for only one operation.

A sonotrode of this type has become known, for example, with the subject of EP 567 426 A2. Said EP 567 426 A2 relates to a so-called reciprocating cutting. This means that the sonotrode performs lifting motions in the axial direction and the blunt front end of the sonotrode horn is intended to perform punch-out-type cutting operations on a work piece. A longitudinal cutting operation along the edge of a work piece is not possible with this system. A simultaneous operation of the sonotrode as a welding tool and cutting tool, however, is not provided for in this system. This poses the disadvantage that when a welding and cutting is called for, said two operations must be performed one after the other. This entails the risk of an inferior quality since, because of the different guide mechanisms of a cutting and a welding tool, the parallelism of the weld seam with the edge of cut is not guaranteed. In fact, in the case of particularly difficult contours of certain work pieces it has been impossible to perform these operations one after the other.

The invention, therefore, has as its object to improve a sonotrode of the above type in such a way that the cutting and welding can take place with significantly better accuracy and increased quality, as well as to describe a method for its operation.

To meet this object, the sonotrode is characterized according to the technical teaching of claim 1.

It is a significant feature of the invention that, viewed in the axial direction of the sonotrode, a circular cutting blade is affixed on the sonotrode body substantially free from oscillations, and that in other respects a sonotrode disc is disposed on the sonotrode body at an axial distance from the cutting blade, said sonotrode disc carrying out, as oscillation transmitter, the welding operation with its outer circumference.

With the presented technical teaching, the significant advantage results that both a welding tool in the form of a sonotrode disc, as well as additionally a cutting tool in the form of a cutting blade is now disposed on one and the same tool.

Within the framework of the present invention, the cutting blade may, of course, be implemented in any desired form. The cutting blade is preferably implemented as a cutting disc, i.e., having cutting edges extending around its circumference. However, the invention is not limited to this. The cutting blade may be designed dentiform, oval, or in any other desired manner on its outer circumference. Also, the cutting edges do not need to be implemented extending around the entire outer circumference, instead they may be discontinuous as appropriate. With a corresponding operation of a tool of this type, perforated edges of cut would then be attained, for example, depending on the desired cutting result.

The invention also is not dependent upon the sonotrode disc that performs the ultrasonic welding operation to be designed evenly all around its circumference. This sonotrode disc also may be implemented with recessed surfaces on its circumference, so that only some surfaces in succession perform welding operations and the surfaces that are recessed behind them do not perform the welding operation. In this manner a kind of stitch seam is obtained.

It is important that the inventive dual tool now moves on the work piece in a kind of rolling contact movement, and a cutting and welding operation takes place simultaneously. This is a significant difference and advantage compared with the prior art, because in the printed publication mentioned at the beginning only a reciprocating cutting takes place, during which a simultaneous welding, however, was not possible.

The technical teaching according to the invention now presents the advantage that, for example a woven fabric can be continually welded onto itself or onto a plastic work piece and can be simultaneously cut during the welding operation.

It is important in this context that the cutting blade is affixed on the sonotrode in such a way that it is supported acoustically neutral, i.e., substantially free from oscillations.

The term "substantially free from oscillations" means that minor oscillations onto the cutting blade in the axial direction are permitted. However, these oscillations must be limited in order to prevent a breaking of the cutting blade during the cutting operation. The cutting operation thus does not take place under the effect of ultrasonic oscillations, instead it is a purely mechanical cutting process. For this reason the vibrational decoupling is proposed according to the invention between the cutting blade and welding sonotrode.

It is not ruled out within the framework of the present invention, however, that certain radial oscillations may still be exerted also onto the cutting blade, so that the cutting blade penetrates into the work piece being cut in an improved manner also under the effect of ultrasonic oscillations.

A method for operating the novel welding and cutting tool is characterized in that the welding and cutting takes place in one and the same operation.

A method of this type has the advantage that it produces a superior quality weld seam and cutting seam because both seams are absolutely parallel to each other, since the two tools are disposed on the sonotrode body in strict parallelism. This also makes it possible for the first time to appropriately cut or weld work pieces that have complicated shapes. In an example embodiment—which does not restrict the inventive concept of the invention—it will be described later that in the case of an approximately shell-shaped work piece, for example, a folded-over edge of a woven fabric is present and this folded-over edge is placed onto the edge of the shell-like tool[1], welded to it, and the projecting edge is cut off.

[1]Translator's note: The word "tool" in the above translation is based on the word "Werkzeug" in the German-language document. It appears that this is a typographical error and the intended word was "Werkstück", which would translate into English as "work piece".

The resulting weld seam between the woven fabric and the plastic portion of the work piece is then absolutely parallel to the edge of cut of the woven fabric located at a distance to the former.

It is important for the invention that the entire sonotrode body is rotationally symmetric, because the welding and cutting takes place in the form of a rolling-contact type movement over the work piece.

The subject of the present invention is derived not only from the subject of the individual claims but also from the combination of the individual claims.

All information and features revealed in the documentation, including the abstract, especially the spatial implementation presented in the drawings, are claimed as essential for the invention, as far as they are novel compared with the prior art either individually or in combination. The invention will be explained in more detail below based on drawings that illustrate merely one possible method of implementation.

Additional features and advantages of the invention that are essential for the invention will become apparent from these drawings and from their description.

Figure 2:
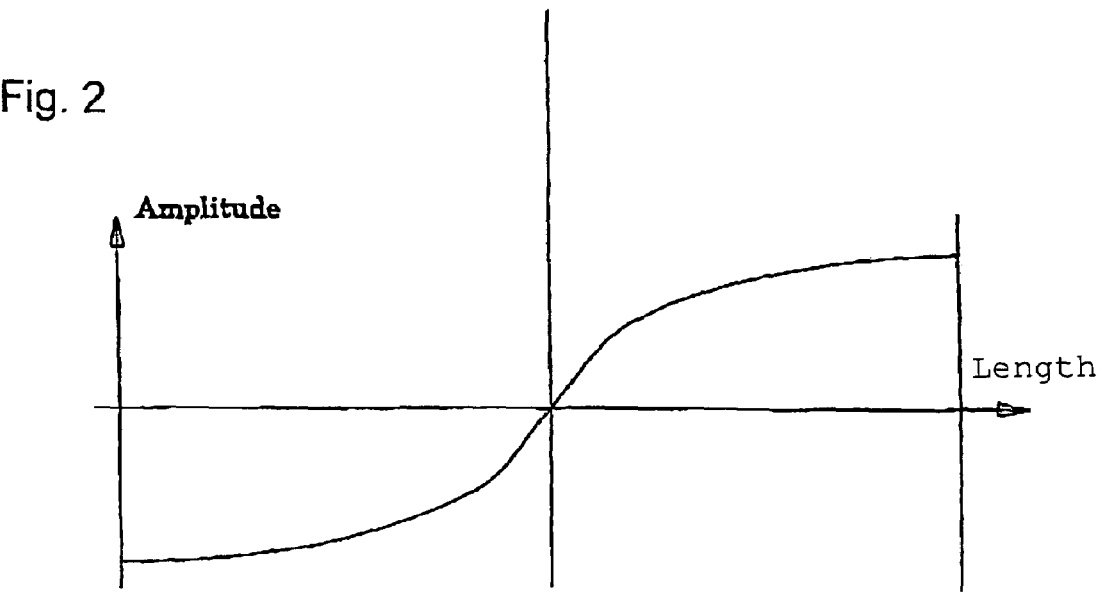
Figure 6:
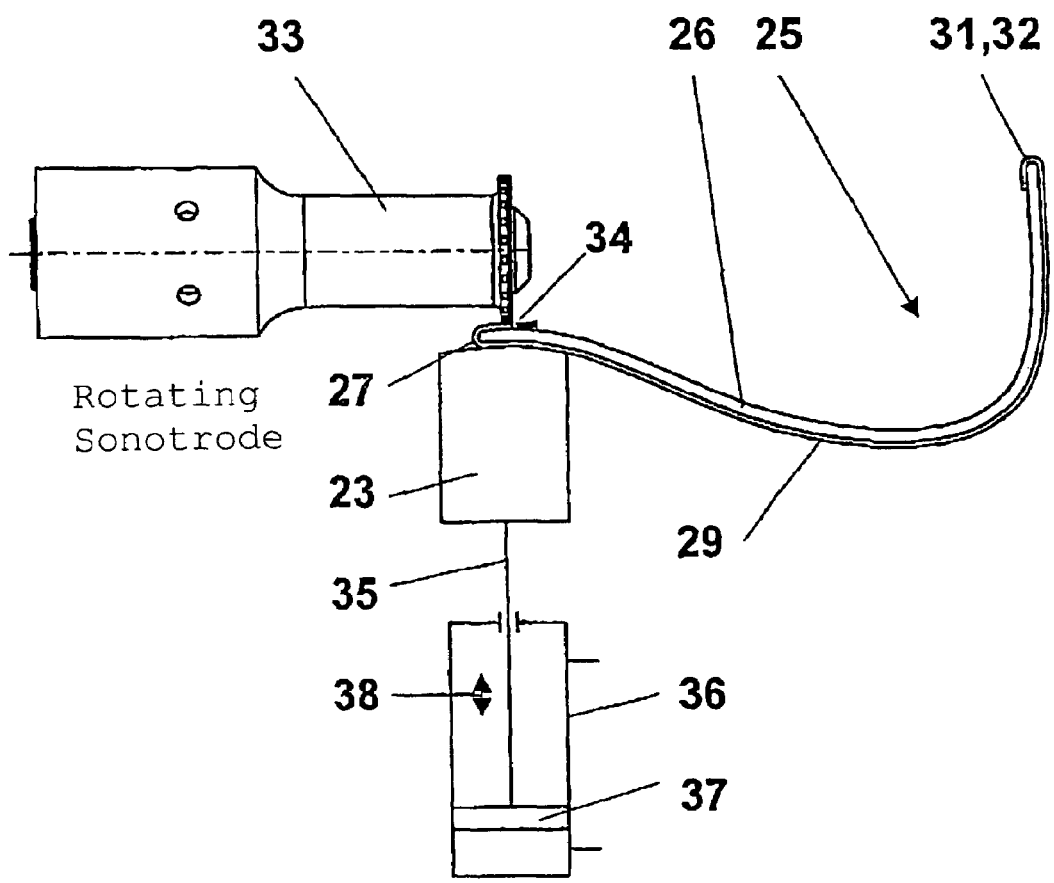
Figure 7:
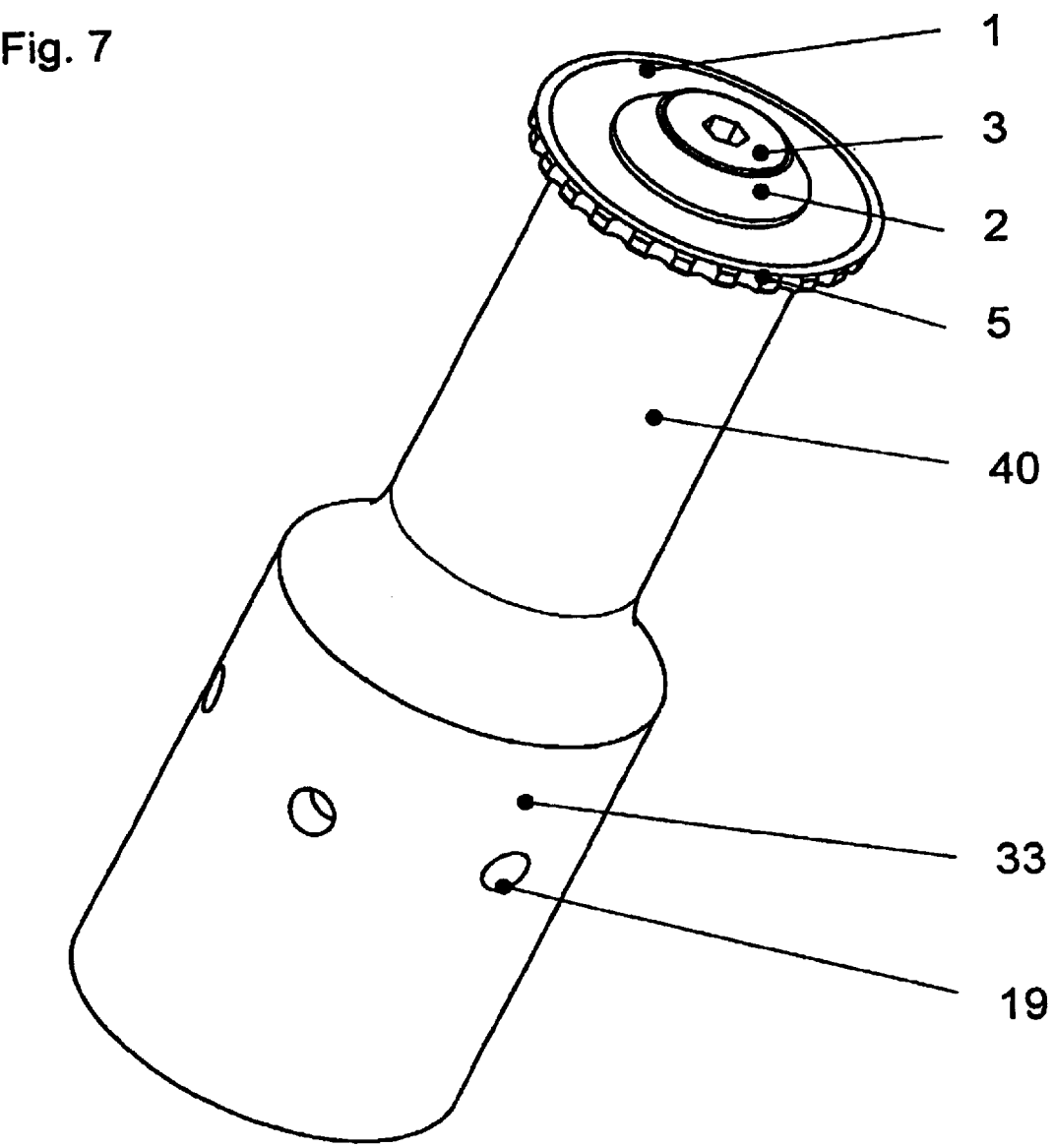

In the drawings,

FIG. 1 shows a partial section through a sonotrode according to the invention,

FIG. 2 shows the oscillation curve over the length of the sonotrode according to FIG. 1, FIG. 3 shows a cutting and welding station using the inventive sonotrode, FIG. 4 shows a perspective view of a plastic work piece to be machined in the welding and cutting station of FIG. 3, FIG. 5 shows a perspective view of the plastic work piece of FIG. 4 with a woven fabric cover, FIG. 6 shows a front view of the sonotrode in the cutting and welding station of FIG. 3, FIG. 7 shows a perspective view of the inventive sonotrade.

In FIG. 1, a sonotrode body 33 is shown that incorporates at its rear, widened shaft radially inwardly oriented fastening bores 19 with which it is fastened on an oscillation generator. Not shown is, that the sonotrode body 33 has associated with it a rotational drive, which rotates, for example, in the direction of the arrow 39. This rotational drive 22 is disposed in connection with FIG. 3 on the cutting and welding station 20.

The shaft of the sonotrode body 33 transitions into a front part of reduced diameter. In the center region the shaft forms a blind bore 15 incorporating an internal thread 18. Threaded into this thread 18 is a threaded bush 17 which, in turn, is glued radially inward to the sonotrode body 33.

The threaded bush 17 forms a front-facing, free external thread 16, onto which a matching blade holder 4 is screwed.

The blade holder is thus screwed into the large annular space 7 of the sonotrode body 33, said annular space 7 being open toward the front at its face end.

The reduced-diameter shaft forms a shaft 40 that is extended toward the front in the axial direction and integrally connected to a sonotrode disc 5.

The outer circumference of the sonotrode disc 5 creates the weld seam on a suitable plastic work piece 28 (see FIG. 5 with the stitch seam 32).

The invention is not limited to creating the sonotrode body 33 from the increased-diameter shaft and shaft 40 of reduced diameter, as well as the connected sonotrode disc 5 that is integrally connected to it, from one material. Provision may also be made for the sonotrode disc 5 to be affixed as a separate component on the shaft 40 of the sonotrode body 33.

Into the annular space 7 that is open at its face end toward the front, the blade holder 4 is now screwed, in the above-described manner. The blade holder has a front face 10 and sitting against it the disc-shaped cutting blade 1.

It is now important that between this face 10 and the face 11 of the sonotrode disc 5, a distance 6 is created, which ensures that the cutting blade 1 is acoustically decoupled from the sonotrode disc 5.

This is achieved in such a way that the face 10 extends beyond the face 12 in the axial direction in order to thus create the distance 6.

In a preferred example embodiment the distance may be 0.45 mm, for example. However, the invention is not limited to this. Random distances may be chosen with respect to the distance 6; for example, the cutting blade 1 may also be affixed at a distance of 10 or 20 mm from the sonotrode disc 5.

The cutting blade 1 is additionally fastened by means of a holding disc 2, whose tapered center bore is permeated by a fastening screw 3. This fastening screw 3 is screwed with its bolt end into an associated thread 13 on the inner circumference of the blade holder 4. The thread 13 is disposed in this case in the area of a blind bore 14.

In addition to the axially acting decoupling as a result of the distance 6 between the cutting blade and sonotrode disc 5, there also exists an acoustic decoupling acting in the radial direction. For this purpose, the annular space 8 is provided, which is formed on the outer circumference of the blade holder 4 radially outward in the direction toward the inner circumference of the shaft 40.

This annular space 8 has a dimension, for example, of a few tenths of a millimeter.

This annular space 8 is thus open at its face end toward the front, where it forms an annular space 9, which is covered by the cutting blade 1.

It is of importance in this context that the cutting blade 1 is affixed only on the blade holder 4 and that the fastening is performed acoustically both in the axial as well as in the radial direction at a distance from the sonotrode body 33.

The sonotrode disc 5 essentially oscillates in the directions of the arrows 12.

FIG. 2 shows an oscillation amplitude drawn over the length of the sonotrode body 33.

In this illustration it is apparent that the oscillation null is approximately in the center region of the sonotrode body (approximately at the lower end of the annular space 7) and that the increased-diameter shaft oscillates with one amplitude whereas the sonotrode disc 5 oscillates in the opposite direction with an amplitude of approximately the same size.

An apparatus into which the sonotrode 41 is installed, is shown in FIG. 3. The cutting and welding station 20 essentially consists of a frame 21 in which the sonotrode elements 1, 4, 5 are fastened by means of appropriate suspension means. This sonotrode 41 has an associated rotational drive 22.

Provided at a distance from the same is a counterpart tool 23, which creates in the direction toward the sonotrode 41 a work piece receptacle 24 for inserting or holding a work piece 25 to be machined. As an example, a work piece 25 is shown in FIG. 4, which is essentially composed of plastic forming a half-shell 26 creating edges 27 that are symmetrical to each other.

According to FIG. 5, this half-shell 26 shall now be covered from one side with a woven fabric-like cover 29 and the respective edges of the cover shall be pulled over the edges 27 as projecting edges 30 and welded and cut off there.

With the inventive tool and the inventive method it is now possible to simultaneously apply an edge of cut 31 for cutting off the projecting edges 29, and additionally a stitch seam 32 during the rolling-contact type movement of the cutting and welding tool, for example in the direction of the arrow 28. With this stitch seam 32 the folded-over cover 29 is welded to the inside of the shell 26.

FIG. 6 shows a tool of this type in an enlarged and schematic illustration. It is apparent that the excess piece 34 of the cover 29 forming beyond the edge of cut 31 is being cut off by the cutting blade 1. At the same time, the above stitch seam 32 is applied as a discontinuous weld seam with the aid of the sonotrode disc 5.

FIG. 6 additionally shows that the counterpart tool 23 is advancable toward the cutting and welding tool in the directions of the arrow 38. A cylinder 36 is used for this purpose in whose interior space a piston rod 37 is driven in the two directions 38 of the arrow. The piston rod 35 acts upon the counterpart tool, causing it to press, with adjustable pressure, the work piece 25 against the cutting and welding tool.

It is therefore important that in one and the same operation, both a welding process and a cutting process takes place.

FIG. 7 shows the sonotrode 41 in a perspective and front view. It is apparent that the cutting edge of the cutting blade 1 projects beyond the outer circumference of the sonotrode disc 5 in the radial direction. This means that while the cutting edge of the cutting blade 1 penetrates into the woven fabric being cut and carries out the cutting process, the outer circumference of the sonotrode disc 5 simultaneously rolls over the woven fabric to be welded and creates the above-mentioned stitch seam 32. Of course it is possible with the invention to also form continuous weld seams aside from discontinuous weld seams.

DRAWING LEGEND

1 Cutting blade
2 Holding disc
3 Fastening screw
4 Blade holder
5 Sonotrode disc
6 Distance
7 Annular space (large)
8 Annular space (small)
9 Annular gap
10 Face (blade holder)
11 Face (sonotrode)
12 Direction of arrow
13 Thread
14 Blind bore
15 Blind bore
16 Thread
17 Threaded bush
18 Thread
19 Fastening bush
20 Cutting and welding station
21 Frame
22 Rotational drive
23 Counter tool
24 Work piece receptacle
25 Work piece
26 Half-shell
27 Edge
28 Direction of arrow
29 Cover
30 Projecting edges
31 Edge of cut
32 Stitch seam
33 Sonotrode body
34 Excess piece
35 Piston rod
36 Cylinder
37 Piston
38 Direction of arrow
39 Direction of arrow
40 Shaft
41 Sonotrode

What is claimed is:

1. A sonotrode (41) for carrying out cutting or welding operations on work pieces (25) in a single operation, wherein the sonotrode (41) has associated with it a rotational drive (22) whereby the sonotrode (41) is drivable in a rotating manner and the sonotrode (41) thus performs, during the simultaneous cutting and welding of the work piece (25), a rolling-contact type movement, and wherein the sonotrode (41) incorporates a sonotrode body (33), a circular cutting blade (1) that carries out the cutting process, and a sonotrode disc (5) disposed at an axial distance from the cutting blade (1) said sonotrode disc (5) being operative to carry out, as an oscillation transmitter, the welding process with its outer circumference, characterized in that the cutting blade (1) is affixed on a blade holder (4) substantially free from oscillations on the sonotrode body (33) and vibrational decoupling between the cutting blade (1) and the sonotrode disc (5) is created by their axial distance (6), that a first annular space (8) is provided between the blade holder (4) and the sonotrode body (33) for vibrational decoupling acting in the radial direction, that the first annular space is open at its face end toward the sonotrode disc (5), that the sonotrode body (33) has a further annular space (7) that is open toward the front at its face end, that, for the vibrational decoupling acting in the radial direction, the first annular space (8) is formed on the outer circumference of the blade holder (4) radially outward in the direction toward the inner circumference of the shaft (40), and that the further annular space has a lower end that is approximately at the center region of the sonotrode body.

2. A sonotrode (41) for carrying out cutting or welding operations on work pieces (25) in a single operation, wherein the sonotrode (41) has associated with it a rotational drive (22) whereby the sonotrode (41) is drivable in a rotating manner and the sonotrode (41) thus performs, during the simultaneous cutting and welding of the work piece (25), a rolling-contact type movement, and wherein the sonotrode (41) incorporates a sonotrode body (33), a circular cutting blade (1) that carries out the cutting process, and a sonotrode disc (5) disposed at an axial distance from the cutting blade (1) said sonotrode disc (5) being operative to carry out, as an oscillation transmitter, the welding process with its outer circumference, characterized in that the cutting blade (1) is affixed on a blade holder (4) substantially free from oscillations on the sonotrode body (33) and vibrational decoupling between the cutting blade (1) and the sonotrode disc (5) is created by their axial distance (6), that a first annular space (8) is provided between the blade holder (4) and the sonotrode body (33) for vibrational decoupling acting in the radial direction, that the first annular space is open at its face end toward the sonotrode disc (5), that the blade holder (4) is screwed into a further annular space (7) of the sonotrode body (33), that said further annular space (7) is open toward the front at its face end, that, for the vibrational decoupling acting in the radial direction, the first annular space (8) is formed on the outer circumference of the blade holder (4) radially outward in the direction toward the inner circumference of the shaft (40), and that the further annular space has a lower end that is approximately at the center region of the sonotrode body.

3. A sonotrode according to claim 2, characterized in that the cutting edge of the cutting blade (1) extends beyond the outer circumference of the sonotrode disc (5) in the radial direction.

4. A sonotrode according to claim 2, characterized in that the cutting blade (1) is fastened on the blade holder (4) by means of a holding disc (2) whose tapered center bore is permeated by a fastening screw (3).

5. A sonotrode according to claim 2, characterized in that between the face (10) of the blade holder (4) and face (11) of the sonotrode (5), the axial distance (6) is formed, which ensures that the cutting blade (1) is acoustically decoupled from the sonotrode disc (5).

6. A sonotrode according to claim 2, characterized in that the face (10) of the blade holder (4) extends beyond the face (11) of the sonotrode (5) in the axial direction in order to thus create the axial distance (6).

7. A sonotrode according to claim 2, characterized in that the entire sonotrode body (33) is rotationally symmetric.

8. A sonotrode according to claim 2, characterized in that at a distance from the sonotrode (41), a counterpart tool (23) is provided that forms, in the direction toward the sonotrode (41), work piece receptacle (24) for inserting or holding a work piece (25) to be machined.

9. A sonotrode according to claim 2, characterized in that the counterpart tool (23) is advanceable toward the cutting and welding tool (1, 5) of the sonotrode (41).

10. A sonotrode according to claim 2, characterized in that the work piece (25) is pressed with adjustable pressure against the welding and cutting tool (1, 5) of the sonotrode (41).

11. A sonotrode according to claim 1, characterized in that the cutting edge of the cutting blade (1) extends beyond the outer circumference of the sonotrode disc (5) in the radial direction.

12. A sonotrode according to claim 1, characterized in that the cutting blade (1) is fastened on the blade holder (4) by means of a holding disc (2) whose tapered center bore is permeated by a fastening screw (3).

13. A sonotrode according to claim 1, characterized in that between the face (10) of the blade holder (4) and face (11) of the sonotrode (5), the axial distance (6) is formed, which ensures that the cutting blade (1) is acoustically decoupled from the sonotrode disc (5).

14. A sonotrode according to claim 1, characterized in that the face (10) of the blade holder (4) extends beyond the face (11) of the sonotrode (5) in the axial direction in order to thus create the axial distance (6).

15. A sonotrode according to claim 1, characterized in that the entire sonotrode body (33) is rotationally symmetric.

16. A sonotrode according to claim 1, characterized in that at a distance from the sonotrode (41), a counterpart tool (23) is provided that forms, in the direction toward the sonotrode (41), a work piece receptacle (24) for inserting or holding a work piece (25) to be machined.

17. A sonotrode according to claim 1, characterized in that the counterpart tool (23) is advanceable toward the cutting and welding tool (1, 5) of the sonotrode (41).

18. A sonotrode according to claim 1, characterized in that the work piece (25) is pressed with adjustable pressure against the welding and cutting tool (1, 5) of the sonotrode (41).

* * * * *